United States Patent [19]
Townsend et al.

[11] Patent Number: 5,495,583
[45] Date of Patent: Feb. 27, 1996

[54] VOICE BUS FOR A COMPUTER BACKPLANE

[75] Inventors: Bruce L. Townsend, Kanata; Mary L. Keegstra, Stittsville; Balwantrai Mistry, Nepean; Paul N. Ramsden, Ottawa; Raymond B. Wallace, Kanata, all of Canada

[73] Assignee: Northern Telecom Limited, Quebec, Canada

[21] Appl. No.: 251,992

[22] Filed: Jun. 1, 1994

[51] Int. Cl.⁶ .............................. H04J 3/12; G06F 15/16
[52] U.S. Cl. .......................... 395/282; 395/306; 395/309; 370/85.1; 439/50; 439/61
[58] Field of Search ............................ 395/325; 379/202; 370/62, 58.1, 85.1, 85.12; 439/50, 59, 61, 108, 326, 633, 636

[56] References Cited

U.S. PATENT DOCUMENTS 5,268,903 12/1993 Jones et al. ..................... 370/110.1
5,276,678 1/1994 Hendrickson et al. ................. 370/62

Primary Examiner—Jack B. Harvey
Assistant Examiner—Jeffrey K. Seto
Attorney, Agent, or Firm—F. P. Turpin

[57] ABSTRACT

A voice bus on a computer backplane provides point-to-point connection between a plurality of slots on the backplane to a particular slot. Connection from the plurality of slots is provided by third connectors which lie between first and second connectors defining the slots. Connection to the particular slot is via its respective second connector. In particular, the computer backplane is physically and electrically compatible with the IEEE standard 1014-1987 defining the VMEbus. The presence of the third connector is compatible with the VMEbus standard both electrically and physically.

2 Claims, 4 Drawing Sheets

_5,495,583_

VOICE BUS FOR A COMPUTER BACKPLANE

BACKGROUND TO THE INVENTION

Improvements in speech recognition and speech generation technologies have made fully automated telephone services practical. The combined requirements of computing power and voice channel handling has heretofore been accomplished with separate systems using interfaces for communication. There is thus a need for a system capable of providing both the computational power needed by the speech technologies and flexible voice channel connections.

SUMMARY OF THE INVENTION

In accordance with an embodiment of the present invention there is provided a voice bus for a computer backplane, the computer backplane having, disposed upon a first face, pluralities of first and second connectors distributed along the backplane, each second connector substantially aligned with a respective first connector to define a respective slot across the backplane, the voice bus comprising: a plurality of third connectors disposed upon the first face of the backplane and distributed along the backplane, each third connector substantially aligned with respective first and second connectors in a respective slot; a clock signal line disposed along the backplane adjacent the plurality of third connectors and connected to respective pins therein; and a plurality of voice signal lines connecting each of the third connectors to a particular second connector.

An advantage of the present invention is the provision of a voice bus in a manner which is both physically and electrically compatible with the IEEE standard 1014-1987 known, as the VMEbus specification.

BRIEF DESCRIPTION OF THE DRAWINGS

The present invention will be further understood from the following description with reference to the accompanying drawings in which:

Referring to FIG. 1, there is illustrated in a front elevation a backplane arrangement for providing a voice bus in accordance with an embodiment of the present invention. The backplane 10 includes a plurality of first connectors 12 mounted in equidistant spaced relation on a first surface thereof. The backplane 10 also includes a plurality of second connectors 14, each vertically aligned with each respective one of the first connectors. The pluralities of connectors first and second 12 and 14 together provide connections to two respective transverse busses that conform to an IEEE standard 1014-1987 known as the VMEbus Specification.

A plurality of third connectors 16 are also mounted on the first surface of backplane 10. Each of the third connector 16 is positioned between and aligned with respective ones of the first and second connectors 12 and 14. The plurality of third connectors 16 provide access to the voice bus. Each horizontal position as defined by the vertically aligned first, second and third connectors is referred to as a slot. In the present embodiment, the slots are numbered, from left to right, from 1 to 21.

Figure 1:
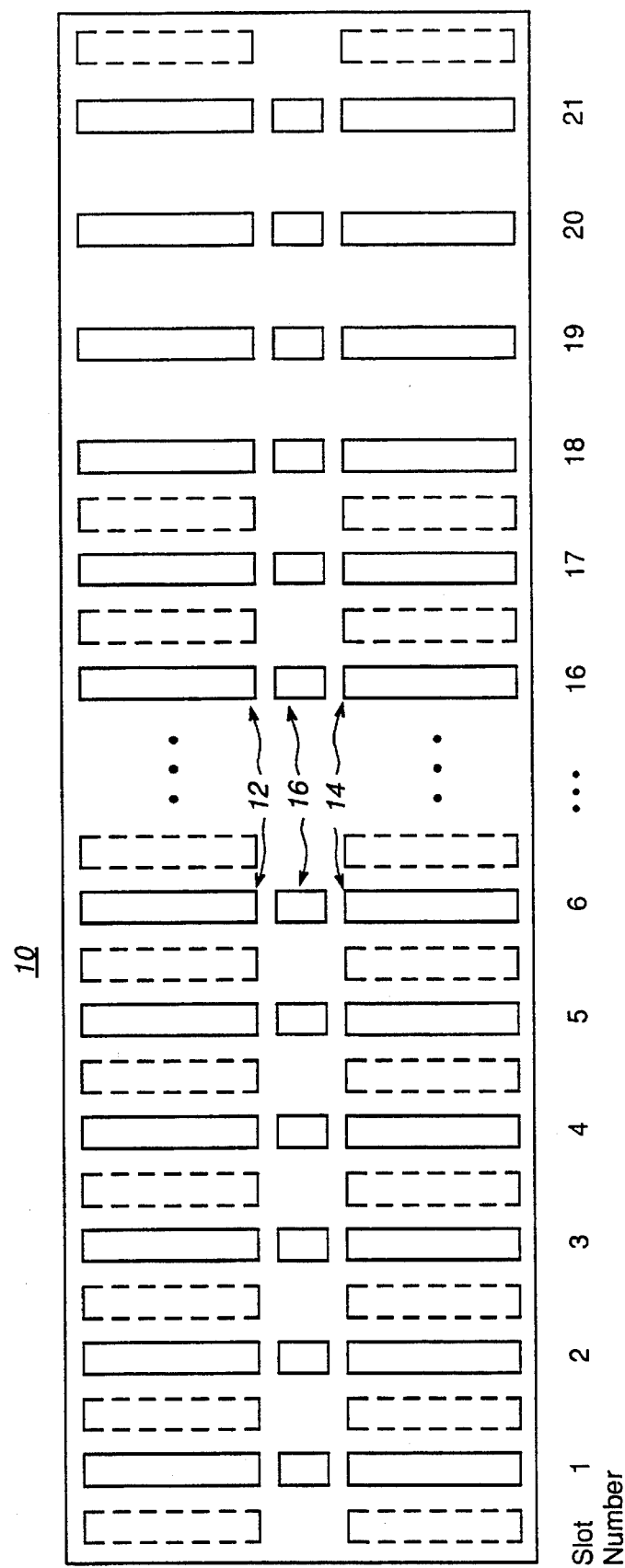
FIG. 1 illustrates, in a front elevation, a backplane arrangement including a voice bus in accordance with an embodiment of the present invention.
Figure 2:
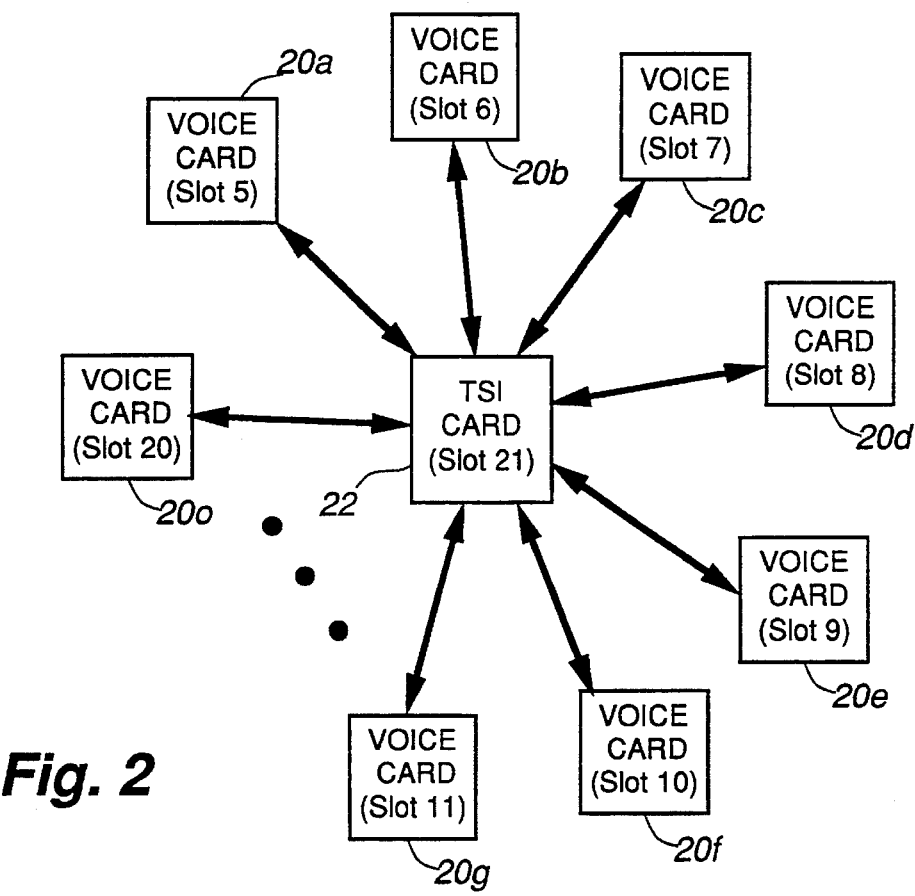
FIG. 2 illustrates, in a block diagram, the voice bus in accordance with an embodiment of the present invention.

Referring to FIG. 2, there is illustrated in a block diagram, the voice bus in accordance with an embodiment of the present invention. The voice bus is in the form of a star. In the present embodiment, the slots connected via the voice bus are slots 5 through 20, and the slots to which the voice bus connections are made is slot 21. Voice cards 20a–p connected to slots 5 through 20, respectively, communicate with a time-slot-interchange (TSI) card 22 connected to slot 21 via the voice bus lines 22.

Figure 3:
FIG. 3 illustrates a timing diagram for signals typically carried on the voice bus of FIG. 2.
Figure 3:
Figure 3:
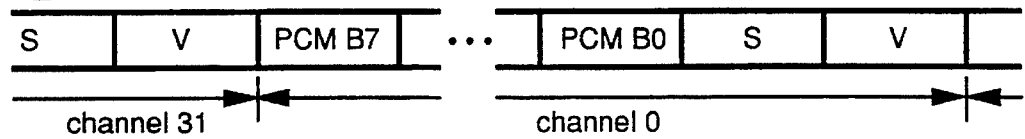
Figure 3:
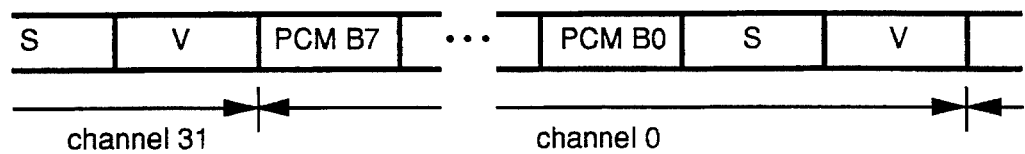

Referring to FIG. 3, there is illustrated a timing diagram for signals typically carried on the voice bus. A clock signal TSICLK is shown as a) in non-differential form for simplicity. In the present embodiment, the clock signal is a 5.12 MHz square-wave having a 50% duty cycle. The synchronization signal (SYNC) is shown as b) and comprises a single pulse having a width of one clock period. In the present embodiment, the synchronization signal is a pulse with a frequency of 1 kHz. A receive signal (TSI-RX) is shown as c) in FIG. 3. The receive signal (TSI-RX) is a serial 32-channel signal with 10 bits per channel organized in frames of 125 μs. The beginning of each frame (channel 0) is marked by the center of the synchronization pulse (SYNC). The first eight bits are used for PCM bits, with bits 9 and 10 available for signalling bits S and V respectively. A transmit signal (TSI-TX) is shown as d) in FIG. 3. The transmit signal (TSI-TX) is a serial 32-channel signal with 10 bits per channel organized in frames of 125 μs.

Figure 4:
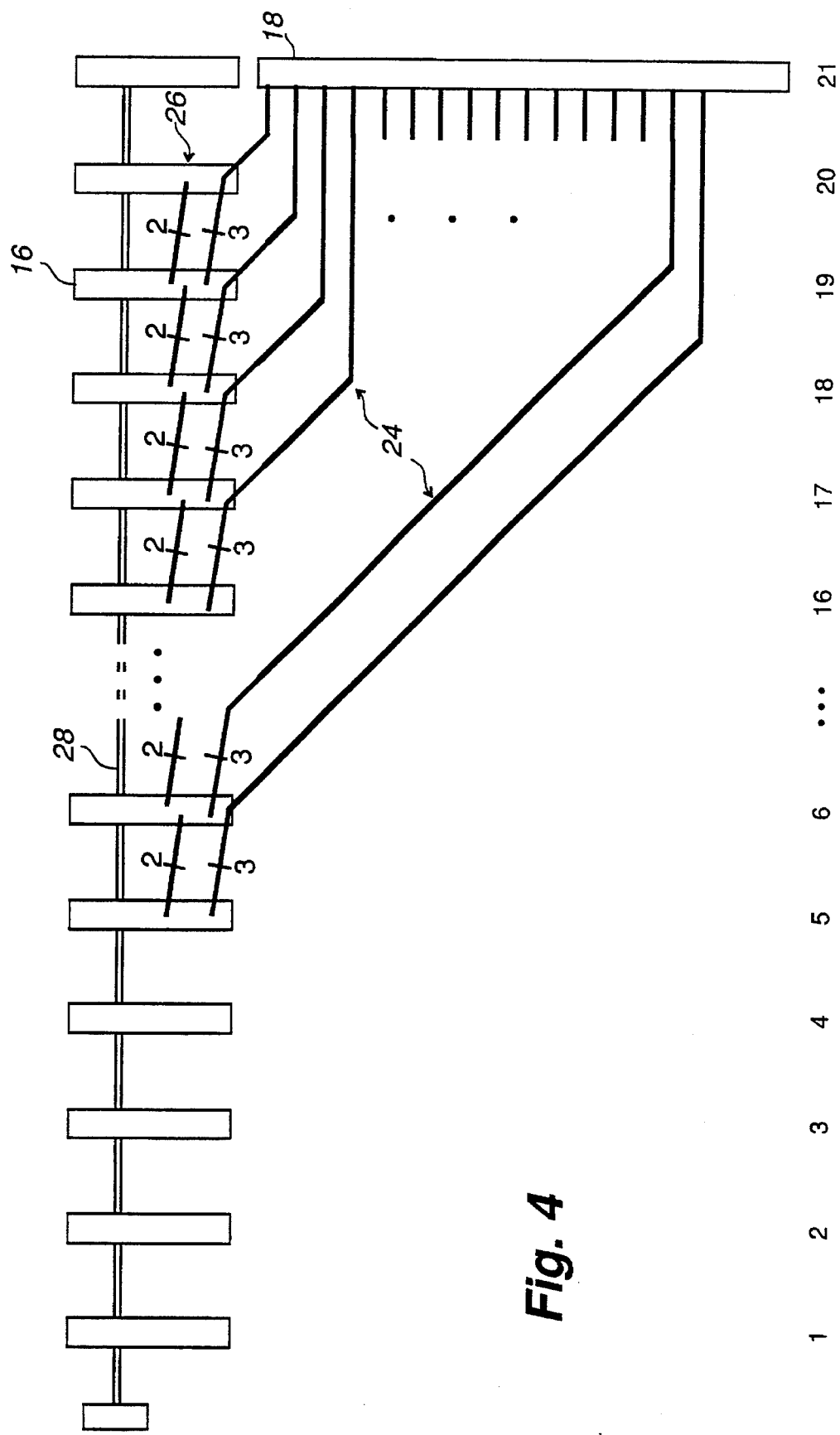
FIG. 4 schematically illustrates the voice bus of FIG. 2.

Referring to FIG. 4, there is schematically illustrated the voice bus in accordance with an embodiment of the present invention. The voice bus provides bidirectional point-to-point communications between a number of the plurality of third connectors 16 and a particular one 18 of the plurality of second connectors 14. For simplicity, only the plurality of third connectors 16 are shown and the particular second connector 18 between which the voice bus extends. A subset of the plurality of third connectors 16 are connected point-to-point to the particular second connector 18 via a plurality of lines 24. Each of the plurality of lines 24 includes three (3) tracks for carrying respective transmit, receive and synchronization signals. In the present embodiment of FIG. 3, third connectors for slot 5 through slot 20 are so connected. The three signals from a given slot are also connected to the previous slot, for slot 6 through slot 20. Sense lines 26 are provided for carrying a sense signal from a given slot to the adjacent slots, to indicate the presence of a voice card in the given slot that may use the serial link. The voice bus uses the third connector 16 located between the two VME connectors 12 and 14 to carry the voice bus signals between the TSI and the other VME slots. A clock line 28 including two parallel tracks and a termination carries the differential clock signal from slot 21 to slots 5 through 20.

Table A gives the pin-out for the third connectors 16. The receive and transmit directions for the data are defined from the view of the TSI (i.e. the TSI's receive and transmit data).

TABLE A

| Pin Number | Row A | Row B |
| --- | --- | --- |
| 1 | | |
| 2 | | |
| 3 | | |
| 4 | | |
| 5 | GND | SxxCOUT* |
| 6 | TSICLK+** | TSICLK−** |
| 7 | GND | SxxCIN* |
| 8 | Sxx_TX* | Sxx_SYNC* |

TABLE A-continued

| Pin Number | Row A | Row B |
| --- | --- | --- |
| 9 | Sxx_RX* | Syy_SYNC* |
| 10 | Syy_TX* | Syy_RX* |

*Slots 5–20 only
xx = Slot number (5–20)
yy = Slot number −1 (i.e. xx − 1) (NC in Slot 5)
**Slots 5–21 only For Row A, the signals are: on pin 5 ground (GND); on pin 6, positive portion of differential clock signal (TSICLK+); on pin 7, ground (GND); on pin 8, transmitted signal to slot number xx (Sxx_TX); on pin 9, received signal from slot number xx; and on pin 10, transmitted signal to next lower slot number to slot number xx (Syy_TX, where yy=xx−1).

For Row B, the signals are: on pin 5, sense signal output for a given slot number to the next higher number (Sxx-Cout); on pin 6, negative portion of differential clock signal (TSICLK−); on pin 7, sense signal input to a given slot number from the next lower slot number (SxxCIN); synchronization signal to slot number xx (Sxx_SYCH); synchronization signal to next lower slot number yy (Syy_SYNC); and, on pin 10, received signal from next lower slot number yy (Syy_RX).

Table A shows how each slot has access to two 32 channel serial links, one shared with the next lower slot, and the second shared with the next higher slot. The sharing is based on exclusive use, where only one of the two cards may use each shared link. This allows each card to have 32 channels or for cards to use 64 channels when adjacent slots not using any. To ensure that two cards do not use the same link, two pins, Row B—pins 5 and 7, on the voice bus connector are used as sense lines. The SxCOUT pin (pin 5) must be tied to ground on all circuit packs (voice cards) that connect to the voice bus. The SxCOUT pin is routed to the S(x+1)CIN pin (where x is the slot number). A card that uses two 32 channel serial links will have a pull-up on its SxCIN pin. Such a card must check this input to see if it is pulled down, indicating that there is a voice processing card in the preceding slot. If this is the case, then this card must not use the secondary 32 channel serial link.

Figure 5:
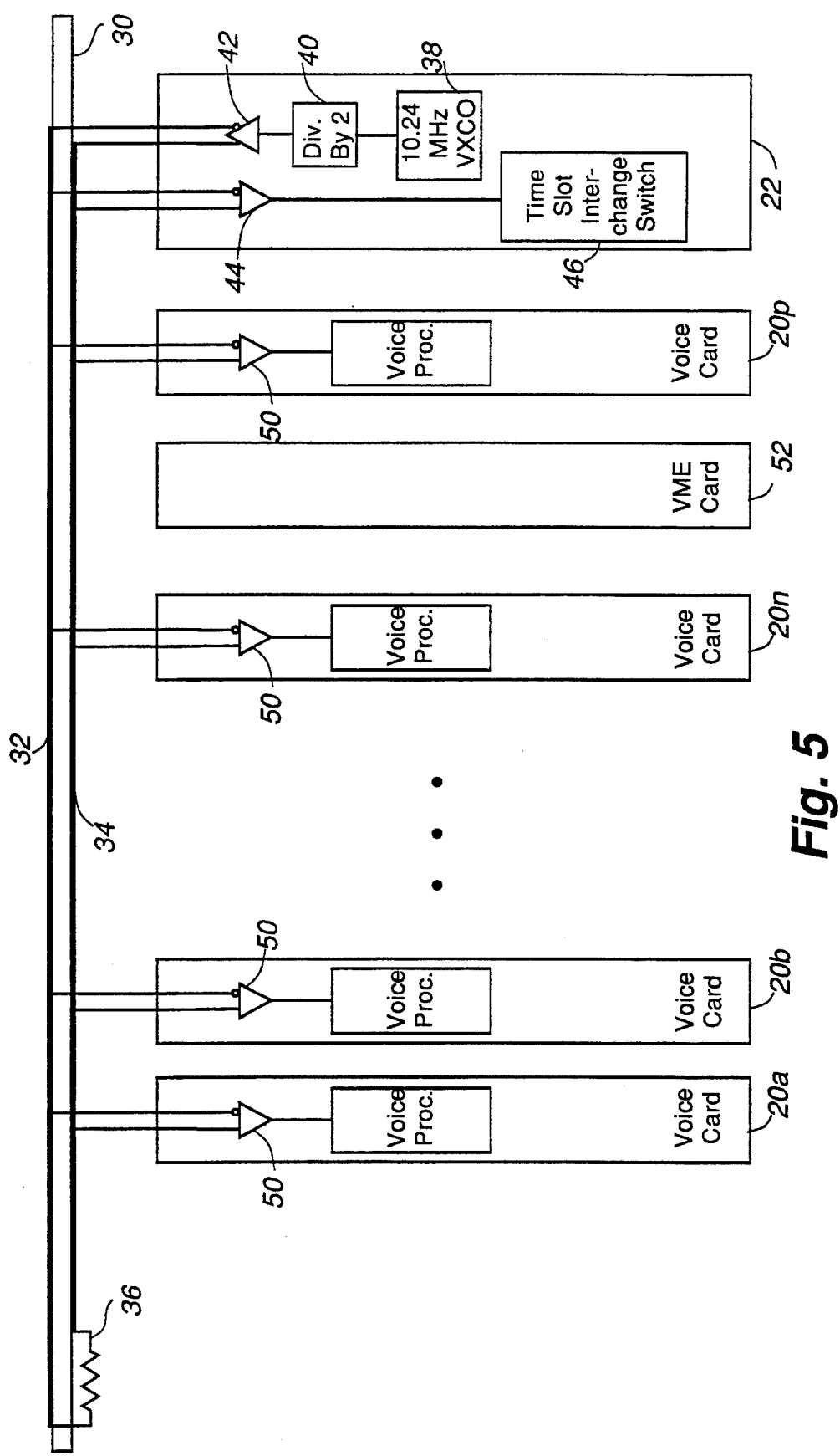
FIG. 5 schematically illustrates the TSI clock distribution for the voice bus of FIG. 2.

Referring to FIG. 5, there is schematically illustrated the TSI clock distribution for the voice bus of FIG. 3. The TSI clock signal is carried along the length of backplane 30 by two substantially parallel lines disposed adjacent third connectors 16 (not shown in FIG. 5). The clock lines 32 and 34 are terminated on the backplane 30 with a 120 ohm resistor 36 therebetween. The TSI card 22 includes a 10.24 MHz VXCO 38, a divide-by-two circuit 40, a differential driver 42. The TSI card 22 drives the differential clock signal TSICLK onto clock lines 32 and 34 via its third connector 16 (pin 6, Rows A and B). Each voice card, 20a through 20p, receives the differential clock signal (TSICLK) via its repsctive third connector 16 (pin 6, Rows A and B). The TSI card 22 also includes a differential receiver 44 and a time slot interchange (TSI) switch 46. Each of the voice cards 20a–20p includes a differential receiver 50.

Also shown in FIG. 5 is a standard VME card 52 in the slot of voice card $20_0$.

This is possible because the presence of the voice bus does not interfere with the use of slots for standard VMEbus compatible cards. The backplane providing the voice bus remains completely compatible, both physically and electrically, with the IEEE Standard 1014-1987, VMEbus Specification.

In operation, the TSI switch allows connection of any one of the 32 channels received from one voice card, e.g. voice card 20b, to be connected to any one of the 32 channels transmitted to another voice card, e.g. voice card 20n. A TSI switch of this type is disclosed in U.S. Pat. No. 4,873,682, entitled "Digital Key Telephone System", by George F. Irwin, et al., issued Oct. 10, 1989, the entire diclosure of which is hereby incorporated by reference.

The receive and transmit directions for the data are defined from the view of the TSI (i.e. the TSI's receive and transmit data). The pin-out of the TSI card is shown in Table B. The TSI uses the third connector to drive the clock signals.

TABLE B

| TSI P2 pin designations (Slot 21) | | | |
| --- | --- | --- | --- |
| Pin Number | Row A | Row B | Row C |
| 1. | TSICLK+ | +5 VDC | |
| 2. | TSICKL− | GND | |
| 3. | GND | Reserved | |
| 4. | | | |
| 5. | | | |
| 6. | S20_TX | | S20_SYNC |
| 7. | S19_SYNC | | S20_RX |
| 8. | S19_RX | | S19_TX |
| 9. | S18_TX | | S18_SYNC |
| 10. | S17_SYNC | | S18_RX |
| 11. | S17_RX | | S17_TX |
| 12. | +5 VDC | GND | GND |
| 13. | S16_TX | +5 VDC | S16_SYNC |
| 14. | S15_SYNC | | S16—RX |
| 15. | S15_RX | | S15_TX |
| 16. | S14_TX | | S14_SYNC |
| 17. | S13_SYNC | | S14_RX |
| 18. | S13_RX | | S13_TX |
| 19. | GND | | +5 VDC |
| 20. | S12_TX | | S12_SYNC |
| 21. | S11_SYNC | | S12_RX |
| 22. | S11_RX | | S11_TX |
| 23. | S10_TX | | S10_SYNC |
| 24. | S9_SYNC | | S10_RX |
| 25. | S9_RX | | S9_TX |
| 26. | +5 VDC | | GND |
| 27. | S8_TX | | S8_RX |
| 28. | S7_SYNC | | S8_RX |
| 29. | S7_RX | | S7_TX |
| 30. | S6_TX | | S6_SYNC |
| 31. | S5_SYNC | GND | S6_RX |
| 32. | S5_RX | +5 VDC | S6_TX |

From the point of view of driving the clock bus, it is advantageous to drive the bus from one end, since to drive from the center would reduce the impedance presented to the driver by a factor of two, or would necessitate the use of two clock buses with two clock drivers. Thus, in the present embodiment, the TSI card is located in slot 21, and slots 5 to 20 are each provided with one serial bidirectional 32 channel connection to the TSI card.

For the present embodiment, the TSI_RX, TSI_TX and sync lines are TTL level, point to point connections. The basic track impedance specified for the backplane is as close to 100 ohms as possible, and to simplify the design of the backplane the tracks for the voice bus should also have a nominal impedance of 100 ohms. The driver should be an ALS active pull-up bus driver, such as a 74ALS244. Since the total track lengths will be longer than the maximum recommended for unterminated lines, these lines should be terminated at the receiver (on the cards, not the backplane). The termination also ensures that the line is pulled up when no driver is connected to the line, resulting in an idle code of FF hex. This termination consists of 1K32 ohms to +5 volts and 1K78 ohms to ground. The receiver can be an ALS gate.

For the differential clock lines (TSICLK +/−) RS485 drivers and receivers are used. RS485 drivers and receiver were chosen since RS485 drivers can drive 32 devices, while RS422 drivers can only drive ten. As these are fairly slow devices, the relatively short backplane appears as a lumped, mainly capacitive and resistive, load.

To accommodate these relatively slow clock drivers and receivers, the time slot interchange switch 44 gets its timing by recovering a clock signal from the backplane bus rather than from the input to the clock drivers. This has the advantage that as the clock lines are loaded up by plugging in more cards, the timing automatically accommodates for this; also the differential driver delays can safely be ignored. The receivers may for example be DS96F175 by National Semiconductor chosen because of relatively high speed. Transceivers may not be used on voice cards 20 because the associated drivers present a substantially higher capacitive load than a receiver-only device. To further limit the capacitive load on each card, the clock stub tracks on each card should be less than two inches long. The driver chosen for the TSI card may for example be a DS75176B transceiver by National Semiconductor, chosen because its timing is specified into a 100 pF capacitive load, and because it is available in a small package (eight pin). Since RS422/485 drivers usually drive into a transmission line that appears as a resistive load their timing is usually specified into 15 pF.

It is also necessary to derive the sync pulses from a source which provides them. Staggered sync pulses can be easily produced using an eight bit shift register that clocks the master sync pulse through.

Numerous modifications, variations and adaptations may be made to the particular embodiments of the invention described above without departing from the scope of the invention, which is defined in the claims.

What is claimed is:

1. A voice bus for a computer backplane, the computer backplane having, disposed upon a first face, pluralities of first and second connectors distributed along the backplane, each second connector substantially aligned with a respective first connector to define a respective slot across the backplane, the voice bus comprising: a plurality of third connectors disposed upon the first face of the backplane and distributed along the backplane, each third connector substantially aligned with respective first and second connectors in a respective slot; a clock signal line disposed along the backplane adjacent the plurality of third connectors and connected to respective pins therein; a plurality of voice signal lines connecting each of the third connectors to a particular second connector; and wherein any of said slots having first, second, and third connectors is physically and electrically compatible with a circuit card requiring only the first and second connectors.

2. A voice bus as claimed in claim 1 wherein the circuit card is a VMEbus compatible card.

* * * * *